United States Patent [19]
Hentschke

[11] Patent Number: 5,771,121
[45] Date of Patent: Jun. 23, 1998

[54] OBSERVER-ADAPTIVE AUTOSTEREOSCOPIC SHUTTER MONITOR

[76] Inventor: Siegbert Hentschke, Wilhelmshoeher Allee 71, D-34121 Kassel, Germany

[21] Appl. No.: 525,208

[22] Filed: Sep. 8, 1995

[30] Foreign Application Priority Data

Jan. 7, 1995 [DE] Germany .................. 195 00 315.2

[51] Int. Cl.$^6$ .................. G02B 27/22; H04N 13/04; H04N 9/47
[52] U.S. Cl. .................. 359/463; 359/462; 349/95; 348/51; 348/56; 348/59
[58] Field of Search .................. 359/463, 464, 359/465, 466, 74, 470, 475, 40, 59; 348/59, 56; 349/15

[56] References Cited

U.S. PATENT DOCUMENTS

| | | | |
|---|---|---|---|
| 5,315,377 | 5/1994 | Isono et al. | 348/51 |
| 5,465,175 | 11/1995 | Woodgate et al. | 359/463 |
| 5,475,419 | 12/1995 | Carbeny | 348/59 |
| 5,493,427 | 2/1996 | Nomura et al. | 359/40 |
| 5,528,420 | 6/1996 | Momochi | 359/463 |

FOREIGN PATENT DOCUMENTS

| | | |
|---|---|---|
| 0332268 | 9/1989 | European Pat. Off. . |
| A-0 540 137 | 5/1993 | European Pat. Off. . |
| A-0 645 659 | 3/1995 | European Pat. Off. . |
| 3921061 | 1/1991 | Germany . |
| 4114023 | 11/1992 | Germany . |
| WO-A-92 22989 | 12/1992 | WIPO . |
| WO-A-94 10805 | 5/1994 | WIPO . |

OTHER PUBLICATIONS

Von B. Wendland and D. Coy, "Zur Optimalen Codierung Von Video–Einzelbildern," Mitteilung aus dem Lehrstuhl für Nachrichtentechnik, Universität Dortmund, pp. 325–334.

Börner: "Autostereoscopic 3D–imaging by front and rear projection and on flat panel displays". In: Displays, vol. 14, No. 1, (1993), pp. 39–46.

D.J. McCartney et al.: "Telecommunications Applications for 3–D imaging systems". In: Proc. SPIE, vol. 1669,.

H.–P. Meinzer et al.: "The Heidelberg Ray Tracing Model" In: IEEE Computer Graphics and Appln., Nov. 1991, p. 34 ff.

S. Hentschke: "Personenbezogener autostereoskoper Bildschrim". P 44 33 058.8 (1994).

R. Börner: "Autostereoskopische Rückprojektions– und Flachbildschirme". In: Fernseh– und Kinotechnik, vol. 48, No. 11, 1994. pp. 594–600.

B. Wendland: "Konzepte für ein kompatibles HiFi–Fernsehsystem." NTG–Fachberichte 74, 1980, pp. 325–334.

S. Hentschke: "Stereoskope Echtzeit–Bildverarbeitung" CeBIT Exponat und Broschüre, 1994.

*Primary Examiner*—Paul M. Dzierzynski
*Assistant Examiner*—Audrey Chang
*Attorney, Agent, or Firm*—Spencer & Frank

[57] ABSTRACT

Stereoscopic perspectives changing with the position of the observer's eyes create a natural depth-impression. An electronically controlled adaptive monitor is disclosed that imitates this feature without any additional devices such as glasses, so that items in front and behind the screen appear in a three-dimensional manner. Alternatively, the monitor can also be used as a high-resolution two-dimensional screen. This combined performance feature is achieved at a reasonable price by mounting a grid-shield with vertical cylinder lenses in front of the monitor. At the focal point of the cylinder lenses is an electronically controlled shadow-line grid-LCD, allowing the alternating passage of right and left pictures sequentially at 100 or 120 Hz. Depending on the position of the observer, the location of the shadow-lines is changed adaptively, while the respective right- and left-eye perspectives of the 3D-picture can be calculated in real-time simultaneously. A sensor system at the rim of the screen detects the exact head- and eye-position of the observer.

19 Claims, 2 Drawing Sheets

OBSERVER-ADAPTIVE AUTOSTEREOSCOPIC SHUTTER MONITOR

BACKGROUND OF THE INVENTION

Stereoscopic methods of filming and projecting have been in use for years. Most methods use polarized light (horizontally, vertically and circularly) in order to separate the right from the left picture (see S. Hentschke, German Offenlegungschrift DE 41 14 032). The development of LCD techniques has made electronic control of the light-transmission of liquid crystals feasible. This has made a shutter-technique possible, which alternatingly makes the left and right glass of shutter-glasses non-light transmissive and synchronously displays the right and left picture sequentially on the monitor (see S. Hentschke, A. Herrfeld, C. Junge, and R. Kothe: "Stereoskope Echtzeit-Bildverarbeitung," CeBit Exponent und Broschüre, 1994).

Autostereoscopic projections are realized by means of projection panels with stripe lens grids from different projection directions. Each perspective picture is then fitted to the correct projection direction (see R. Börner: "Autostereoscopic 3D-imaging by front and rear projection on flat panel displays," *Displays*, Vol. 14, No. 1 (1993), pages 39–46). However, it is almost impossible to achieve a flowing transition from one perspective to the next, since the number of projection directions cannot be enlarged arbitrarily. With an autostereoscopic display aimed at one single user, only two perspectives are used that require a certain direction of viewing (see D. E. Sheat, G. R. Chamberlin, P. Gentry, J. S. Leggart, and D. J. McCartney: "3-D Imaging Systems for Telecommunications Applications," *SPIE*, Vol. 1669, p. 186, Electronic Imaging Systems and Applications Meeting, San Jose (1992), and R. Börner: "Autostereoskopische Rückprojektions- und Flachbildschirme," Fernseh- und Kinotechnik, Ed. 48, Nr. 11 (1994), pages 594–600). A fully stereoscopic picture like in a hologram is achieved by use of "head tracking sensors" that control a high-capacity real-time computer for calculation of an appropriate stereoscopic perspective on the one hand, and on the other hand control the autostereoscopic display for mechanical adjustment of a lens grid shield. It detects the exact position and movement of the observer's head and simultaneously generates the appropriate pictures. Furthermore, costly VR-Systems (Virtual Reality) utilizing "Head Mounted Displays" are in use.

It is an advantage of an autostereoscopic monitor that the user does not need to wear special eye-glasses as required for other known methods of stereoscopic image processing, such as the shutter principle or polarization principle. In order to achieve the stereoscopic effect from different directions of view, existing systems have so far adaptively moved the lens or prism-shield mechanically. This movement can lead to wear and failure.

Stereoscopic utilization, however, remains restricted to one single observer per monitor (although collective use of a monitor is possible by additionally using the shutter principle with glasses). The most important short-term applications are certainly in the field of medical-engineering, where the restriction to one observer does not constitute a disadvantage. After all, it is usually only one person that interprets a 3D-CT-Scan: the radiologist, a doctor who needs to avoid disturbing glasses and a restricted field of vision. In the case of more than one doctor working at the same time, it is possible to use multiple monitors (and in case of an auditorium wanting to follow a microsurgical operation, this will be feasible by projection methods utilizing polarized light, for example).

Nuclear magnetic resonance and computer tomography are the most important fields of the application of stereoscopic 3D-imaging in medical engineering. In order to calculate certain perspectives that are needed, high-performance computers are being developed for "Volume Tracing Algorighms" (see H. P. Mainzer, K. Meetz, D. Scheppelmann, V. Engelmann, and H. J. Bauer: "The Heidelberg Ray Tracing Model," 1 *EEE Computer Graphics and Applications* (November 1991), pages 34ff). The combined computed visualization and real-time transmission of endoscopes are becoming a very important neuro-surgical tool. Stereoscopic endoscopes are currently in use already. It will be easy to combine an infrared based "head tracking sensor" with an observer-adaptive autostereoscopic monitor system for electronic control of movement.

Stereoscopic television will also have its place in future digital television systems' as it meets natural seeing habits. When the time comes that the digital coding includes the additional information for the third-dimension it will be at an optimum of its use. But even today, stereoscopic test programs would be feasible without a lot of additional expenses, if program channels were used accordingly, e.g. by televising the perspective of the right eye on one channel and that of the left eye on the other channel. If there is no stereoscopic recording available or needed, an HDTV-imitating transmission could be tested fully compatible on two NTSC (PAL)-channels with current TV-devices. At home, at the "consumer," present 120 (or 100) Hz TV sets could make stereoscopic presentations possible by use of the shutter principle (see, again, S. Hentschke et al., "Stereoskope Echtzeit-Bildverarbeitung, supra).

An autostereoscopic method is required for natural stereoscopic presentation. It would be desirable for the user not to be bound to a certain fixed position in front of the monitor, but to be able to move the head freely in order to observe a 3D-scene actively from minutely changed directions of vision. This requires an adaptive system that can naturally orient itself with respect to the observer. For wider use of such a monitor, it would be desirable for such a system to also offer the possibility of being switched to a non-stereoscopic mode. Since both the right and left picture channels will be available then, this double information flow as compared with monoscopic presentation could then be made use of to double the resolution quality.

Another problem area is the mechanical system for the lens grid shield that has been required for adaptive stereoscopic monitors so far.

So far, solutions for autostereoscopic monitors working alternatively either in a stereoscopic or a high-resolution mode and technologically suitable for large-scale production purely through application of electronics have not been known.

SUMMARY OF THE INVENTION

Since mechanic movement in an autostereoscopic display can lead to wear and failure, the inventor has chosen to introduce an alternative electronic solution that is suitable for high production volume, and that is suitable for a future high-resolution television as well. Perhaps controlled by a television program, it is possible to choose either an observer-adaptive stereoscopic mode or a high-resolution mode (HDTV).

According to the invention, an observer-adaptive autostereoscopic shutter-monitor includes a cylinder-lens grid-shield, a shadow-line grid-LCD, and a monitor (such as a picture tube, display, or projection apparatus) having a screen for displaying a picture. The shadow-line LCD lies between the cylinder-lens grid-shield and the screen, and is positioned approximately in the focal point of the lenses. The non-transparent parallel shadow stripes of the shadow-line grid-LCD are controlled electronically in such a manner that for an 8 to 10 msec period that is synchronized with the picture, only the right eye can look through to the picture, and then alternatingly the left eye for the same time, and so on.

Once inexpensive flat TV sets reach the market, it will make sense to additionally equip them with observer-adaptive autostereoscopic shutters. The interested consumer will be able to have an autostereoscopic TV in the near future, just as he/she has his/her personal computer today, particularly as it makes possible the most natural 3D-presentation without any disturbing devices such as special glasses.

Finally, the investment-intensive field of flight simulation and flight navigation is a further possible field of application, particularly since, for this application, usually a single person is the user anyway.

DETAILED DESCRIPTION OF THE PREFERRED EMBODIMENTS

It is known that the principle of autostereoscopic monitors is based on the fact that, due to a grid of prism- or lens-shaped vertical stripes on a sheet of glass in front of a flat screen, with the vertical stripes being disposed at double the spacing of the pixels, the right eye can see all even pixels in a line and the left eye sees only all odd pixels (or vice versa). By this, a separate picture can be transmitted to each eye independently with the correct pixel control, so that together a stereoscopic picture is obtained. This is not restricted to black and white presentation but also works for all three colorpoints (usually RGB) controlled in a pixel group. However it is essential that the three color pixels be located above each other and not—as occurs often—in a horizontal manner or triangularly, as this might lead to color modifications that cannot be controlled.

When the position of the observer's eyes changes in front of the monitor, either the pixel position has to be adjusted electronically (see S. Hentschke: German Offenlegungsschrift DE 41 14 14 023) or the grid opposite the pixel has to be adjusted, which in the past has been done mechanically. The first principle would only be applicable for expensive trinitron-index-electron beam tubes. The latter principle is more or less restricted to the use of flat screens.

Figure 1:
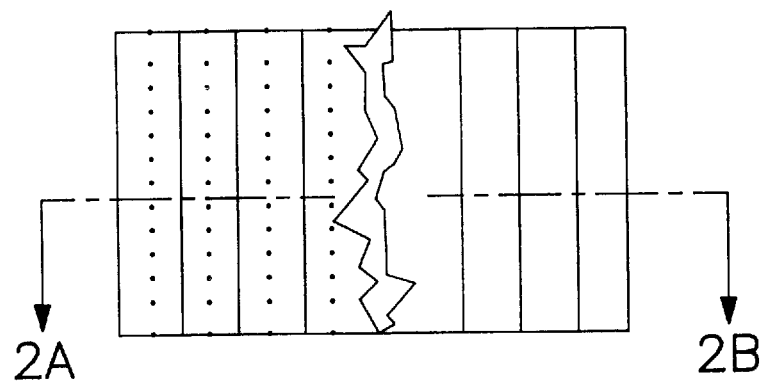
FIG. 1 illustrates a front view of an observer-adaptive autostereoscopic shutter-monitor according to a first embodiment of the present invention.
Figures 2A, 2B:
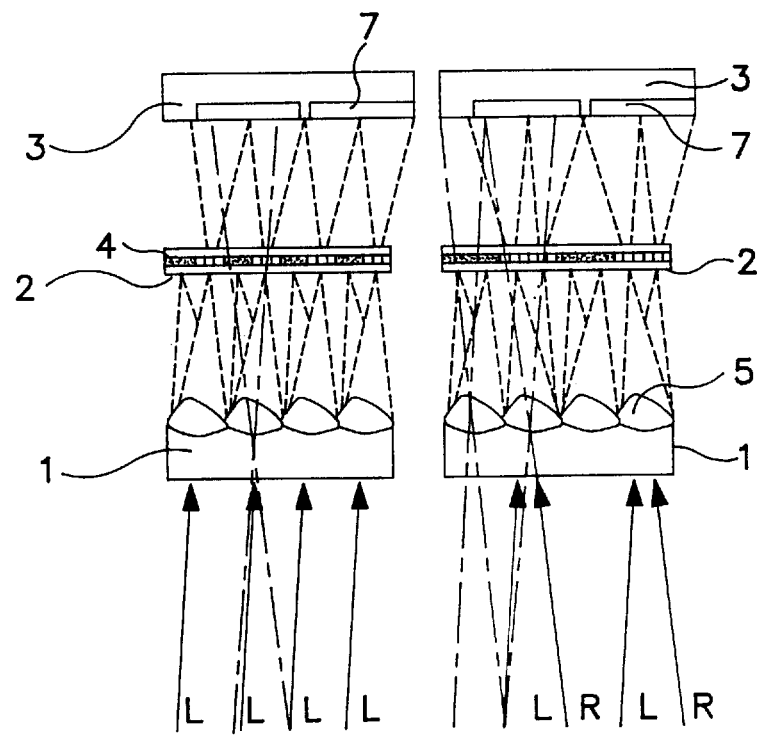
FIG. 2A is a sectional view taken along the line 2A in FIG. 1.
FIG. 2B is a sectional view taken along the line 2B in FIG. 1.

The observer-adaptive autostereoscopic shutter-monitor of the invention will now be described in detail with reference to the drawings. The observer-adaptive autostereoscopic monitor consists of a cylinder-lens grid-shield 1 with vertical cylinder lens 5, an electronic shadow-line grid-LCD 2 controlling each column, and a conventional 100/120 Hz monitor 3. The problem described above is solved in the present invention by using the cylinder-lens grid-shield 1 beside the shadow-line grid-LCD 2, the width of the shadow stripes 4 and their position being controlled electronically. They can be switched off within a msec. If such an LCD 2 is used between the cylinder-lens grid-shield 1 and the picture surface close to the focal point, alternatingly at 120 (or 100) Hz frequency according to the shutter principle, the right field and the left field can be made visible by switching on the odd and even stripe numbers synchronously with the field, as is indicated in FIG. 2A. The advantage of this is the fact that the cylinder-lens grid-shield 1 does not have to be adjusted synchronously to the pixels 7 of the picture. In case of changes of the observer's position, the positions of stripes 4 can be adjusted electronically. As the depth of the focal point of the lenses 5 changes only minutely when the (far bigger) observing distance changes, the stripe grid can be adapted to the detected observing distance without having to change the distance between the cylinder-lens grid-shield 1 and the screen of the monitor 3. Since this principle replaces the sidepositions over the width of one cylinder lens 5, the pitch distance of the lenses 5 should be half as big as that of the (information technical) pixel distance. When using a TFT-color-display the three colored pixels of a group should be positioned above each other and be equivalent to two lens widths. As in a precise order of the cylinder lens structure, according to the optical path given in FIG. 2A (the optical path is indicated by arrows), no pixel elements will appear hidden or double for one eye, this principle neither requires a pixel-synchronous order nor a planar surface of the picture. Hence, it is possible to use traditional color tubes and supply them with the devices needed for autostereoscopic presentation.

The monitor 3 should preferably have a flat screen with color pixels organized above each other (e.g., a TFT-color display) or be a traditional color monitor with a 120(100) Hz frequency. A projection panel would also do, if pictures were projected onto it with a frame- or half-frame frequency of 120 (or 100) Hz. The distance of the focal point (r) of the cylinder-lenses to these is approximately $r=p*b/2a$, with b being the distance of the observer (e.g., b=2000 mm), a being the basic distance between the eyes (e.g., a=75 mm), and p being the pitch distance of the cylinder-lenses 5 (e.g., p=0.5 mm); the latter is equal to the width of the lenses 5. Hence, we obtain for example a distance of the focal point of $r=0.5*2000/(2*75)$ mm=6.66 mm. The shadow-line grid-LCD 2 is positioned within the distance of the cylinder-lens grid-shield 1. It produces light-non-transmissive vertical stripes 4 of approximately half the width of a lens 5 (e.g. 0.25 mm). These stripes 4 are electronically controlled and can be moved horizontally in steps that are equivalent to half the stripe width (this would be 0.125 mm)—if possible, even in steps that are only half as big. The stripes 4 of the shadow-line grid-LCD 2 will be set anew every 8.66 (10) ms.

The light-emitting picture surface or screen of the monitor 3 is positioned at double the distance of the focal point, e.g.

at a distance of 13.2 mm from the cylinder-lens grid-shield 1. The thickness of the glasses has to be considered—including the refraction index n, that affects a change of the de facto distance.

Generally, in the stereo mode the observer sees the pictures within one cycle in the following sequence: 1. right field- 1. left field- 2. right field- 2. left field. In the normal one-channel mode the stripes 4 in the LCD are switched off and pictures are offered in the sequence "1. 1 field- 1. field- 2. field- 2. field" like in the current flickerless 120 (100) Hz-television.

FIG. 2B shows that the same arrangement can be used for doubling the horizontal resolution of the picture. The shadow stripes 4 are doubled over the whole width of the lenses 5 and alternatingly odd and even lens numbers (columns) are made visible. Of course pictures will then have to be coded accordingly: pictures will then be televised in the following sequence: 1. field odd columns- 1. field even columns- 2. field odd columns- 2. field even columns. For optimal resolution enhancement the picture and the stripe position have to be adapted to the position of the observer.

Figure 4A:
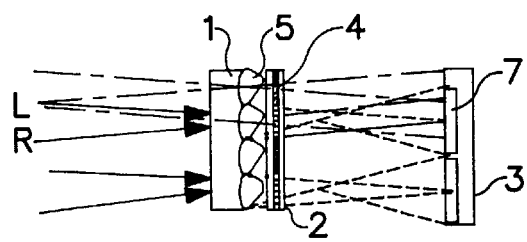
FIG. 4A is a sectional view taken along the line 4A in FIG. 3.
Figure 4B:
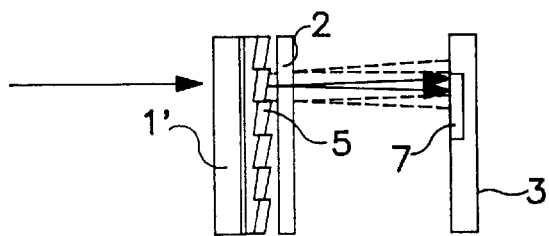
FIG. 4B is a sectional view taken along the line 4B in FIG. 3.
Figure 4C:
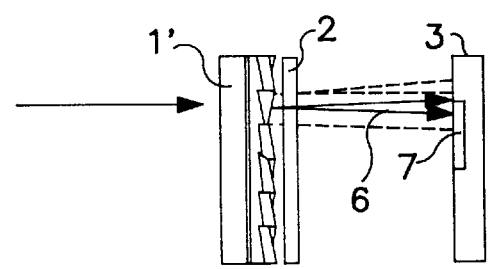
FIG. 4C is a sectional view taken along the line 4C in FIG. 3.
Figure 5:
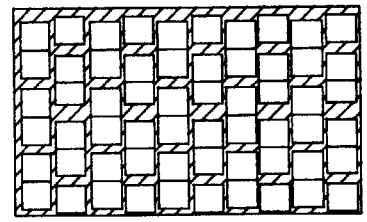
FIG. 5 is a front view showing pixels which are vertically offset.
Figure 3:
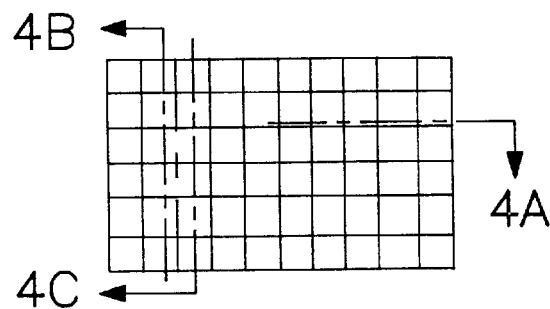
FIG. 3 is a front view for use in explaining alternative embodiments of the observer-adaptive autostereoscopic shutter-monitor.

The high-density mode is also shown in FIGS. 3–5. In order to make the odd and even lens columns transparent, the shadow-line grid-LCD 2 can be moved towards the cylindrical-lens grid-shield 1 as shown in FIG. 4A, or a second shadow-line grid-LCD can be used while in the first one all the shadow-stripes are switched off. In order to achieve a resolution enhancement of the picture in both the horizontal and vertical directions, odd and even columns can be shifted optically by half a stripe (FIG. 5 illustrates an optical view showing the monitor screen with a vertical pixel offset). This can be achieved by superimposing a saw-tooth structure onto the vertical cylinder-lenses to provide a cylinder-lens saw-tooth grid 1' as shown in FIGS. 4B and 4C. Picture coding has to be adjusted accordingly in order to achieve a resolution enhancement in both directions. It is known that such an "offset sampling" of the picture comes closer to human physiological perception of vision (see B. Wendland: "Konzepte für ein Kompatibles HiFi-Fernsehsystem," *NTG-Fachberichte* 74 (1980) pages 325–334)) as presentable local frequencies in the vertical and horizontal directions are "root of 2" times as big as in the diagonal direction in such a sampling grid.

In a case of the producing of lightness in a picture being uncritical and the information on a picture not being concentrated onto points, but continuously spread over the entire area, as given in the case of TFT-Displays, a simple grid made of vertically light-non-transmissive stripes can be used instead of the cylinder lens grid. The second stripe grid (2) can then be adaptively controlled in such a manner, that the view through to the picture surface is blocked for one eye, while the other eye can look through in stripes of half the lens width. To avoid undersampling effects, the pitch distance of the stripes may not be larger than the image spots' distance. Like in the application of polarization methods with glasses for stereoscopic presentation, two thirds of the light is lost when utilizing two stripe structure panels.

Provided that instead of a cylinder lens shield a second controllable shadow-line LCD can be used, it is preferable to control the stripe image-pixel position synchronously, in order to avoid slight Moiré-effects that might otherwise occur.

For position detection, infrared-head tracking systems are suitable. They provide the precision required. However, less expensive ultra-sound systems can also be employed. In case the vertical position and the observing distance should also be detected, a minimum of two sensor fields should be applied. CCD-cameras having fast image-evaluation could also be used. Ultra-sound surveys will be particularly easy if a transmitter is mounted to the head of the observer.

What is claimed is:

1. An observer-adaptive autostereoscopic shutter-monitor, comprising:
   a monitor having a screen for displaying a picture;
   a cylinder-lens grid-shield having a plurality of cylinder lenses which are disposed at a predetermined pitch-distance; and
   a shadow-line grid-LCD positioned between the cylinder-lens grid-shield and the screen, the shadow-line grid-LCD being electronically controlled to have transparent and non-transparent stripes which alternate time-sequentially in synchronism with the picture about every 8 to 10 milliseconds.

2. The observer-adaptive autostereoscopic shutter-monitor according to claim 1, wherein the shutter-monitor is operable in both of a stereoscopic mode and a high-resolution non-stereoscopic mode, wherein the shadow-line grid-LCD is controlled in the stereoscopic mode so that the non-transparent stripes are approximately half as wide as the pitch-distance of the cylinder lenses, and wherein the shadow-line grid-LCD is controlled in the high-resolution non-stereoscopic mode so that the non-transparent stripes are approximately as wide as the pitch distance of the cylinder lenses.

3. The observer-adaptive autostereoscopic shutter-monitor according to claim 1, wherein the cylinder lenses have respective focal points that lie along a focal line, wherein the shadow-line grid-LCD is disposed approximately at the focal line, and wherein the distance between the cylinder lenses and the focal line is approximately half of the pitch-distance of the cylinder lenses multiplied by the ratio of an observer's distance from the observer-adaptive autostereoscopic shutter-monitor to the distance between the observer's eyes.

4. The observer-adaptive autostereoscopic shutter-monitor according to claim 3, wherein the pitch-distance of the cylinder lenses is about 0.5 mm.

5. The observer-adaptive autostereoscopic shutter-monitor according to claim 3, wherein the distance between the cylinder lenses and the focal line is based on an observer distance of about 2 meters and an eye-separation distance of about 7.5 cm.

6. The observer-adaptive autostereoscopic shutter-monitor according to claim 1, wherein the stripes of the shadow-line grid-LCD have separate portions which can be switched on and off independently, wherein the shadow-line grid-LCD is controlled to selectively switch groups of adjacent portions on and off simultaneously, and wherein the portions have a width that does not exceed about a quarter of the pitch-distance of the cylinder lenses.

7. The observer-adaptive autostereoscopic shutter-monitor according to claim 6, wherein the width of the portions is about an eighth of the pitch-distance of the cylinder lenses.

8. The observer-adaptive autostereoscopic shutter-monitor according to claim 6, wherein the width of the portions is less than about an eighth of the pitch-distance of the cylinder lenses.

9. The observer-adaptive autostereoscopic shutter-monitor according to claim 1, further comprising means for calculating and processing in real-time perspectives of a 3D picture to be presented, according to the horizontal- and distance-position of an observer in front of the observer-adaptive autostereoscopic shutter-monitor, so that objects represented in the 3D picture do not change their virtual local position in the room, even if the observer moves.

10. The observer-adaptive autostereoscopic shutter-monitor according to claim 9, wherein the perspectives are calculated and processed by the means for calculating and processing according to the vertical position of the observer in front of the observer-adaptive autostereoscopic shutter-monitor.

11. The observer-adaptive autostereoscopic shutter-monitor according to claim 1, wherein the cylinder lenses have respective focal points that lie along a focal line, wherein the shadow-line grid-LCD is mechanically movable between a position approximately at the focal line and a position adjacent the cylinder-lens grid-shield, wherein the cylinder lenses have a cylinder lens width, wherein cylinder lenses of the cylinder-lens grid-shield form a sequence in which there are even-numbered cylinder lenses and odd-numbered cylinder lenses, wherein the monitor is interlaced and has an interlace duration that is selected to be one of 10 ms and 8.33 ms, and wherein, in a high resolution mode, stripes having the cylinder lens width are switched on and off behind each second one of the cylinder lenses during the interlace duration, alternatingly for even-numbered and odd-numbered cylinder lenses.

12. The observer-adaptive autostereoscopic shutter-monitor according to claim 11, wherein the screen of the monitor provides a plurality of pixels, wherein the cylinder lenses extend vertically, and wherein a horizontal saw-tooth grid is superimposed on the cylinder-lens grid-shield, the saw-tooth grid having inclined faces which alternate between ascending and falling from cylinder lens to cylinder lens, and having a pitch-distance which is approximately the same as the pitch distance of the cylinder lenses so that the pixels appear to be shifted in a vertical sense by half a line from cylinder lens to cylinder lens.

13. The observer-adaptive autostereoscopic shutter-monitor according to claim 1, wherein the cylinder lenses have respective focal points that lie along a focal line, and wherein the shadow-line grid-LCD is disposed approximately at the focal line.

14. The observer-adaptive autostereoscopic shutter-monitor according to claim 1, wherein the shadow-line grid-LCD is controlled so that the transparent and non-transparent stripes alternate in a manner that permits one of an observer's left- and right eyes and then the other of the observer's left and right eyes, in an alternating sequence, to look through to the screen.

15. The observer-adaptive autostereoscopic shutter-monitor according to claim 1, wherein the monitor comprises a picture tube.

16. The observer-adaptive autostereoscopic shutter-monitor according to claim 1, wherein the monitor comprises a display panel.

17. The observer-adaptive autostereoscopic shutter-monitor according to claim 1, wherein the monitor comprises a projection device.

18. The observer-adaptive autostereoscopic shutter-monitor according to claim 1, wherein the pitch-distance of the cylinder lenses is about 0.5 mm.

19. An observer-adaptive autostereoscopic shutter-monitor, comprising:
  a monitor having a screen for displaying a picture;
  a cylinder-lens grid-shield having a plurality of cylinder lenses which are disposed at a predetermined pitch-distance and which have respective focal points that lie along a focal line; and
  a shadow-line grid-LCD positioned between the cylinder-lens grid-shield and the screen at approximately the focal line of the cylinder lenses, the shadow-line grid-LCD being electronically controlled to have transparent and non-transparent stripes which rapidly alternate time-sequentially in synchronism with the picture so that one of an observer's left and right eyes but not the other of the observer's left and right eyes can look through to the screen at a given time.

* * * * *